(12) United States Patent
Engels et al.

(10) Patent No.: US 7,443,830 B2
(45) Date of Patent: Oct. 28, 2008

(54) METHOD FOR DATA COMMUNICATION AND CONTROLLING DEVICE THEREFOR

(75) Inventors: Volker Engels, Berlin (DE); Khaled Fazel, Auenwald (DE); Dietmar Petras, Langerwehe (DE)

(73) Assignee: Ericsson AB, Stockholm (SE)

( * ) Notice: Subject to any disclaimer, the term of this patent is extended or adjusted under 35 U.S.C. 154(b) by 569 days.

(21) Appl. No.: 10/474,874

(22) PCT Filed: Apr. 11, 2002

(86) PCT No.: PCT/IB02/02171

§ 371 (c)(1),
(2), (4) Date: Jun. 7, 2004

(87) PCT Pub. No.: WO02/084930

PCT Pub. Date: Oct. 24, 2002

(65) Prior Publication Data

US 2004/0213174 A1    Oct. 28, 2004

(30) Foreign Application Priority Data

Apr. 11, 2001   (DE) ............................ 101 18 100

(51) Int. Cl.
*H04B 7/212* (2006.01)
*H04Q 7/20* (2006.01)

(52) U.S. Cl. .................. 370/347; 370/337; 370/235

(58) Field of Classification Search ............. 370/232, 370/235, 337, 345, 347; 455/452.2, 453
See application file for complete search history.

(56) References Cited

U.S. PATENT DOCUMENTS

| 5,541,955 A | | 7/1996 | Jacobsmeyer |
| 6,167,031 A | * | 12/2000 | Olofsson et al. ............ 370/252 |
| 6,865,393 B1 | * | 3/2005 | Baum et al. ............... 455/452.2 |
| 6,873,597 B1 | * | 3/2005 | King .......................... 370/235 |

FOREIGN PATENT DOCUMENTS

| EP | 0 903 883 A2 | 3/1999 |
| JP | 09-307541 | 11/1997 |
| WO | WO 99/39472 | 8/1999 |
| WO | WO 00/22865 | 4/2000 |
| WO | WO 01/10046 A2 | 2/2001 |
| WO | WO 01/50669 A1 | 7/2001 |

OTHER PUBLICATIONS

*Resource Allocation With Adaptive QoS for Multimedia Transmission Over W-CDMA Channels*, 2000 IEEE, Qian Zhang, et al., pp. 179-184.

* cited by examiner

*Primary Examiner*—Lee Nguyen
(74) *Attorney, Agent, or Firm*—Kirschstein, et al.

(57) ABSTRACT

For communicating data on a transmission channel (1, 2) between a central station (BS) and a plurality of subscriber stations (M), for each transmission connection between the central station (BS) and a specific subscriber station (M), a method for coding and/or modulating the payload to be transmitted is selected among a plurality of methods supported by the central station (BS) and the specific subscriber station (M). To this end, the load of the transmission channel (1, 2) is detected, and the selection is carried out taking account of the detected load.

27 Claims, 3 Drawing Sheets

METHOD FOR DATA COMMUNICATION AND CONTROLLING DEVICE THEREFOR

The present invention relates to a method for data communication between a central station and a plurality of subscriber stations and more especially, although not exclusively, to a cellular radio communication system, and a device for controlling access of these stations to a commonly used transmission channel.

EP 0 903 883 A2 discloses a method for data communication in a mobile telecommunication system in which for each transmission connection between the central station and a specific subscriber station, a method for coding and/or modulating the payload to be transferred is selected from a plurality of methods which are at the command of the central station and the specific subscriber station.

This known method allows a dynamic adaptation of modulation and coding to changing channel conditions, i.e. if the transmission conditions on the channel are found to be unacceptable, it is possible to switch to a more robust modulation or coding, respectively, in order to maintain the transmission connection. In this way, disturbances due to channel fading can be suppressed to a certain extent. This method thus requires that for a given transmission connection, there is a set of appropriate combinations of modulation and coding which differ in robustness or bandwidth requirements, respectively, and between which a choice can be made according to channel quality. This choice necessarily amounts to selecting, from those combinations of the set that are found to be usable considering the channel quality, the one with the least bandwidth requirements. That is, from all usable combinations, the least robust combination is chosen. Further, transmission capacity remains unused when the system is not operating at full load.

The object of the present invention is to provide a method for data communication on a transmission channel and a device for controlling the access of different transmission connections to said transmission channel that allow a more complete use of its transmission capacity while at the same time optimising the transmission quality. An additional advantage of the method and device of the present invention are their applicability for transmission connections that require different levels of transmission bandwidth and/or quality of service.

The object is achieved by selecting the coding and/or modulating method, which is employed for a transmission connection between the central station and a specific subscriber station under consideration of the load of the transmission channel. Thus it is possible to use rather robust modulation and coding methods, respectively, when the load on the channel is low. This measure leads to decrease in the error rate, or it allows a reduction of transmission power, so that possible interferences with adjacent cells decrease. When the load of the channel increases, the method switches over to less robust codings and modulations, respectively, within the limits of the required quality of service, in order to be able to accommodate as large a number of subscriber stations as possible.

In one method the filling level of the transmission buffer is used to determine the load of the transmission channel. The filling level of the transmission buffer essentially behaves like the time integral of the difference between the rate of generation of data to be transmitted and the rate of the transmission channel and is thus a very sensitive indicator for an eventual overload of the channel. The filling level is particularly appropriate for controlling the load of an uplink or downlink transmission channel.

Alternatively and/or in addition the number of subscriber stations simultaneously communicating with the central station can be used to determine the load of the transmission channel. Such a criteria is particularly advantageous when the transmission capacity requirements of the subscriber stations are homogeneous, or if the number of subscriber stations attended by the central station is so large that differences in bandwidth requirements of individual subscriber stations becomes insignificant.

Advantageously the load of a uplink transmission channel (i.e. between a subscriber station and the central station) is determined from the level of a counter for transmission capacity requests that have been received by the central station and have not yet been satisfied.

If the radio communication system in which the method of the invention is carried out supports transmission connections of subscriber stations having different bandwidths and/or qualities of service, these are advantageously taken into account when selecting the coding and/or modulating method.

When selecting the coding and/or modulating method, it is particularly advantageous also to consider the quality of the transmission channel. If the channel quality were not taken account of, the modulation and/or coding method for a transmission connection would have to be selected so that even under poor conditions (e.g. when a subscriber station is located at the border of a cell) it satisfies transmission conditions. In contrast, if the channel quality is taken account of, coding and/or modulating methods which are less robust but which also require less bandwidth can be used for subscriber stations having good transmission conditions. In this way, transmission capacity can be saved and used for other purposes, such as for example serving a greater number of subscriber stations or using more robust transmission connections to subscriber stations having poor receiving conditions.

Since the transmission conditions of the subscriber stations are variable, it is advantageous to periodically re-select the coding and/or modulating method used for a transmission connection between the central station and a subscriber station while the transmission connection lasts, in order to adapt it to the current transmission conditions and the load of the transmission channel.

For services having asymmetric data rates in downlink and uplink directions, in particular for multimedia services, it is advantageous to select the coding and/or modulating method separately for downlink and uplink.

The transmission channel preferably uses a time division multiplex scheme.

The management of the coding and/or modulating methods and the distribution of the data to be transmitted in the available transmission time are particularly simple if, according to a first embodiment of the invention, the choice of the coding and/or modulating method is carried out uniformly for all subscriber stations communicating with the base station. In this way, it is possible to take account of changes in the transmission quality of the transmission channel that affect all subscriber stations alike. For example if the transmission quality in a cell served by the base station, or in a sector of a cell, varies due to climatic conditions, in particular due to precipitations, this can be accounted for by choosing a more robust coding and/or modulating method whenever transmission conditions become difficult. Detection of such difficult transmission conditions can be carried out automatically according to the present invention by detecting the load of the transmission channel, which increases under difficult conditions. A reason for this can be, that due to more frequent transmission errors data transmissions must be repeated in order to maintain a constant payload data rate. Of course, difficult transmission conditions can also be detected by other methods, for example by monitoring the bit error rate or by measuring directly the climatic conditions in the environs of the base station.

If the selection of the coding and/or modulating method is carried out separately for each transmission connection, the requirements of individual subscriber stations or transmission connections concerning quality of service, data rate etc. can be taken account of much more flexibly.

In any case, it is practical to divide the transmission channel into a plurality of time slots, the number of data packets that can be accommodated into a time slot being variable according to the method selected for coding and/or modulating these data packets.

In such a time slot, it is possible to transmit packets addressed to various subscriber stations. This is particularly useful if the same method is selected for all subscriber stations, because then a subscriber station only needs to know the method in order to be able to determine where within a time slot a data packet addressed to it begins.

If the coding and/or modulating method is selected individually for each transmission connection, a subscriber station must know all methods that are used by other subscriber stations receiving data in that time slot in order to be able to determine a beginning of a data packet addressed to the subscriber station. In such a case it is preferable to transmit in each time slot only data packets addressed to a same subscriber station.

Control information about the individually selected method is preferably transmitted to the respective subscriber stations in a same time slot together with data packets coded/modulated according to that method.

The coding and/or modulation of the control information should be carried out independently from that of the data packets and according to a predefined, non-varying, method. An eventual interleaving of data of transmission connections using the same time slot is carried out individually for each transmission connection. In this way, each subscriber station only has to decode the data that are actually intended for it, and it is possible to modify the assignment of a transmission connection to a time slot at short notice without having to take account of the interleaving conditions of the other transmission connections.

In uplink transmission, i.e. from a subscriber station to the central station, it is preferred that the number of data packets transmitted in one time slot is predefined by the central station. The time required for transmitting this predefined number of data packets, and accordingly the length of the time slot, may vary according to the coding and/or modulating method employed. The advantage of this method over the use of time slots having a predetermined length is that the number of protection intervals which are conventionally inserted at the border between two time slots in order to prevent overlapping reception at the central station can be reduced if a subscriber station transmits a plurality of data packets consecutively. In this way, the efficiency of the transmission is improved.

A further positive effect is that a preamble which is conventionally transmitted together with a data packet and which contains synchronization information for the demodulation of the data packet to be carried out at the receiver needs to be transmitted only once for a plurality of data packets transmitted consecutively, so that, again, the uplink transmission capacity is used more efficiently.

In order to assign transmission time to the various subscriber stations, the transmission channel is preferably divided into signalling periods, and the central station transmits a control data packet for each signalling period indicating the number of data packets that can be transmitted in each time slot of the signalling period. The control information may further identify a subscriber station to which a time slot is assigned and the coding and/or modulating method to be used by it.

Within a time slot comprising a preamble and one or more data packets following the preamble, it is preferred to use a more robust coding and/or modulating method for transmitting the preamble than for transmitting the data packets.

In order that the invention can be better understood embodiments of the invention will now be described, by way of example only with reference to the accompanying drawings in which.

Figure 1:
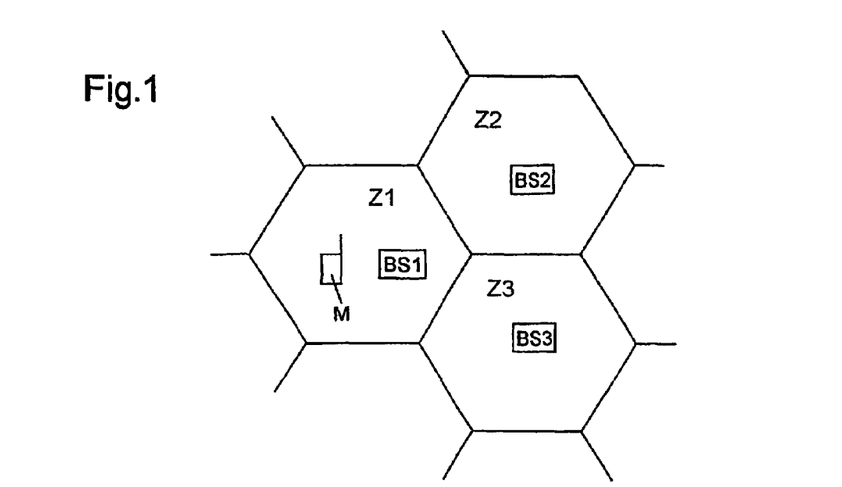
FIG. 1 is a schematic representation of a telecommunication system in which the present invention is applicable.

Referring to FIG. 1 there is shown a simplified schematic representation of a mobile radio communication system in which the present invention is applicable. The system comprises a plurality of base stations BS1, BS2, BS3 as central stations, each of which are adapted to communicate with a plurality of subscriber stations M that are present in a geographical cell Z1, Z2, Z3 assigned to the base station BS1, BS2 or BS3, respectively, only one of which M is represented in the figure. The subscriber stations M and the base stations BS1, BS2, BS3 each support a plurality of different telecommunication services such as speech transmission, facsimile, data transmission, video-on-demand etc. All these services have different quality requirements from the radio communication system such as the admissible data transmission delay and the scatter of these delays, tolerance against transmission errors, downlink and uplink data rates etc.

In order to be able to transmit as large a variety of such services as possible with a requested quality, the base stations and the subscriber stations each support a plurality of different coding and/or modulating methods for the data to be transmitted, such as convolution coding with various memory depths and with various code rates; block coding, in particular Reed-Solomon-Coding, with variable block sizes and a plurality of modulating methods such as n-PSK (Phase Shift Keying), n-ASK (Amplitude Shift Keying) or n-QAM (Quadrature Amplitude Modulation) with n=2, 4, 8, 16, etc.

Figure 2:
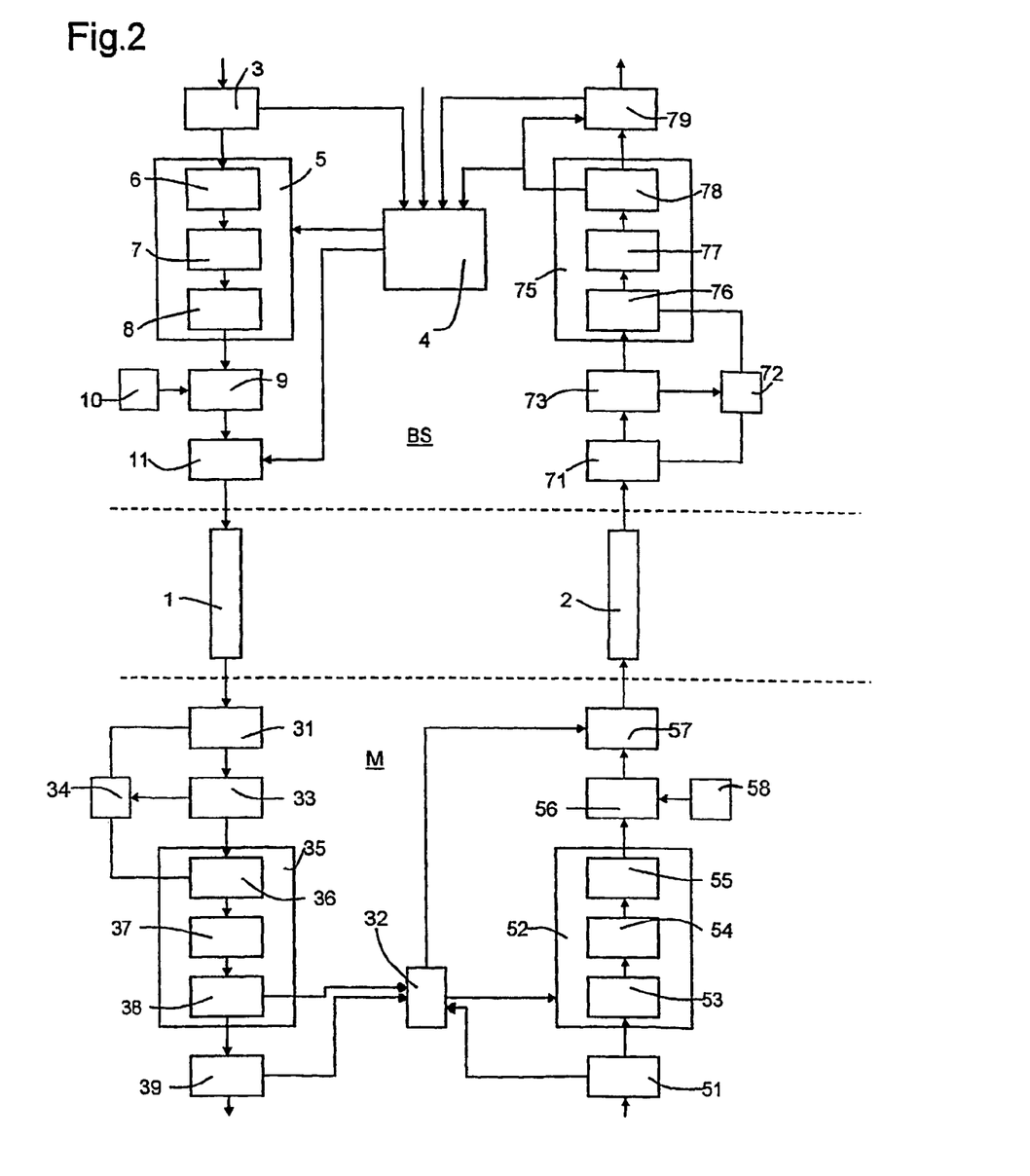
FIG. 2 is a block diagram of a central station and a subscriber station communicating via an uplink transmission channel and a downlink transmission channel.

FIG. 2 shows a block diagram of a base station BS and a subscriber station M that communicates with the base station BS by an downlink channel 1 and a uplink channel 2. The channels 1, 2 are characterized by a carrier frequency and are used for TDMA (Time Division Multiple Access) uplink and downlink communication of the base station BS with a plurality of subscriber stations M.

The base station BS is connected to a data transmission network, also referred to as a core network (not shown in the FIG. 2) for exchanging data packets with other base stations of the radio communication system or with further communication networks.

In the following example, it is assumed that the data packets are ATM (Asynchronous Transfer Mode) cells; though the invention is also applicable to IP (Internet Protocol) packets or other types of data packets.

The base station BS receives the ATM cells from the data transmission network (core network) via an input buffer 3. The ATM cells each comprise a header specifying a connection to a subscriber station M maintained by the base station BS, to which the cell belongs, and payload to be transmitted to said subscriber station M. The input buffer 3 has a MAC (Media Access Control) unit 4 and an encoder 5 connected to it. The purpose of the MAC unit 4 is to assign uplink and downlink transmission capacity to the various subscriber stations M that maintain a connection to the base station BS according to the information contained in the headers of the received ATM cells and to control the coding of the data by encoder 5 using a coding method which is appropriate for the concerned connection and its quality requirements.

The encoder 5 is formed of a plurality of stages connected in series, a first stage being a block encoder 6, preferably a Reed-Solomon-encoder, optionally an interleaving unit 7 as a second stage, and a convolution encoder 8 as a last stage.

A multiplexer 9 for periodically inserting a pilot sequence into the data stream supplied by the encoder 5 is connected to the output of encoder 5. The multiplexer 9 has a modulator 11 connected to its output for modulating the data stream supplied by the multiplexer 9 with a modulation method predefined by MAC unit 4. The sequence of symbols thus obtained is Nyquist-filtered with a roll-off factor of 0.3 and is output to the downlink channel 1.

Figure 3:
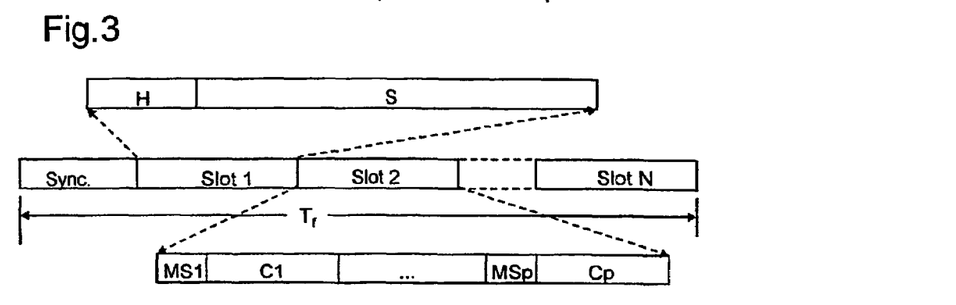
FIG. 3 is a schematic representation of the structure of an downlink frame for data transmission from the central station to the subscriber station of FIG. 2 and of individual time slots of the downlink frame.

The radio signal transmitted on downlink channel 1 is formed of a series of frames having a constant duration $T_f$, the structure of which is shown in FIG. 3. Each frame comprises a synchronization symbol sequence "Sync" generated from the pilot sequence 10, followed by a plurality of fixed length time slots "Slot 1", "Slot 2", . . . "Slot N". The time slots may include signalling information for the subscriber station M or payload.

The structure of a signalling time slot, "Slot 1" as an example, is shown in FIG. 3. The signalling time slot comprises a header H and signalling information S. The header H contains a characteristic symbol sequence and an indication as to which subscriber station the subsequent signalling information is intended, i.e. whether it is addressed to a specific subscriber station or to all of them.

An indication of the meaning of the subsequent signalling information S can be comprised in the header H. Each downlink frame includes such a signalling time slot in which a so-called "period control PDU (Protocol Data Unit)" is transmitted to all subscriber stations. The signalling information of the period control PDU informs the subscriber stations whether the MAC unit 4 has granted them a permission to send, and if so, in which time slots.

A data time slot such as "Slot 2" is formed of p sub-units, each consisting of a modem signalling section MS1, . . . , MSp and a cell section C1 to Cp. Each modem signalling section differs from a header of a signalling time slot by not comprising the above mentioned characteristic symbol sequence, so that the subscriber stations can tell apart signalling and data time slots. Each modem signalling section MS1, . . . , MSp comprises an identification of the subscriber station M for which the subsequent cell section C1, . . . , Cp is intended, and, preferably, further control information intended for the subscriber station M, such as an indication of the transmission power and/or frequency to be used in the uplink. The cell section C1, . . . , Cp comprises the symbols obtained from an ATM cell by coding and modulation in the base station.

In FIG. 3, the signalling sections MS1, . . . , MSp and the cell sections C1, . . . , Cp are shown to alternate in time. Of course, it is also possible to lump the signalling sections in a header at the beginning of the time slot and to transmit only cell sections after the header.

According to a first embodiment of the invention, the coding and/or modulating method used by the base station BS is the same for all subscriber stations M connected to the downlink channel 1. It is therefore not necessary to transmit an indication of the employed coding and/or modulating method in the modem signalling section MS1, . . . , MSp; this information can be transmitted in a signalling time slot of the channel addressed to all subscriber stations.

The number of channel symbols that must be transmitted by radio to a subscriber station for transferring one ATM cell depends on the modulation and/or coding used for the radio transmission. If it is assumed that in the block encoder 6, ATM cells are encoded in pairs with an overhead of 16, the amount of bits to be transmitted increases from 2×53=106 to 122. A subsequent convolution encoding by the convolution encoder 8 with a code rate r<1 further increases the amount of data by a factor 1/r. The number of symbols finally to be transmitted on the downlink channel 1 depends on the number of states of the employed constellation or, in other words, the number of bits that can be encoded by it. If it is assumed that the 122 Reed-Solomon encoded bytes are convolution coded with r=1/2, 244 bytes result. If a constellation having four states such as QPSK is used, 122 symbols are required for transmission. If, instead, a convolution coding is carried out with a code rate of r=2/3 and a modulation having eight states is employed, the number of required symbols is reduced to 61. As can be seen, according to the coding and/or modulating method selected, it is possible to determine the number p of cells that can be transmitted in an downlink time slot.

The cells transmitted in a time slot can be intended for one or for a plurality of different subscriber stations. Since the cells of a time slot are coded together, the same modulation must be used for all cells in order to ensure that the data can be transmitted within the time available therefor.

According to a simple embodiment of the invention, identical coding and modulating methods are selected for all time slots of a frame.

The number of ATM cells that can be transmitted in a frame is proportional to the spectral efficiency of the selected combination of coding and modulating methods. In other words, it is inversely proportional to their robustness. At a border between two time slots or two frames it is always possible to change from a given combination of coding and modulating methods to another, less robust one. This increases the number of cells that can be accommodated into a time slot, i.e. additional transmission capacity is created by which a larger number of subscriber stations can be served.

If the transmission capacity of the radio communication system is not used to its entirety, it is possible to change over to a more robust communication, if the number of cells transmitted per time slot, which is reduced by such a changeover, is still sufficient to satisfy the transmission demands of the existing connection. The changeover to a more robust combination generally leads to a decrease of the error rate, so that less transmission repetitions become necessary. Furthermore, the changeover makes it possible to reduce the transmission power and thus to reduce the risk of interference with adjacent cells.

If worsening transmission conditions require a changeover to a more robust combination, a problem may result if the number of existing connections is so large that the capacity of the transmission channel is not sufficient to accommodate all connections using this more robust combination. In such a case, conditions for a changeover must first be fulfilled by reducing the number of connections. In the worst case, this might be done by having the radio communication system disrupting existing connections to subscriber stations M. In such a situation it may be preferred to interrupt a limited number of connections is interrupted than have all connections suffer from a strongly reduced quality that may finally lead to the connections being interrupted. Preferably, the reduction in the number of connections is carried out by not re-assigning transmission capacity liberated by a subscriber station ending a connection to other subscriber stations trying to establish a connection until sufficient free capacity has been created to enable the change over.

The need to change over to a combination of coding and modulating methods may result from a number of reasons. One reason for changing over to a less robust but spectrally more efficient combination can be an imminent overload of the mobile radio communication system.

There are several methods of detecting such an overload. A first comprises providing the MAC unit 4 with a counter, which maintains a count of the number of connections maintained simultaneously. The MAC unit 4 is operable to select a more robust combination when the level of this counter exceeds a given limit. This simple arrangement is particularly suitable when the subscriber stations of the mobile radio communication system have essentially homogenous requirements for transmission rates and quality of service or if the number of subscriber stations that can be served simultaneously by one transmission channel is so large that random differences in the quality requirements and data rates of the connections maintained by them become negligible.

A second method of detecting overload is to monitor the filling level of the input buffer 3. If it is assumed that cells are read from the input buffer 3 and output to encoder 5 in the same sequence in which they are received from the core network, the filling level of the input buffer 3 can be readily obtained from the difference between a reading pointer pointing to the address of a cell to be read next in the input buffer 3 and a writing pointer pointing to an address where the next cell arriving from the switching network will be written to. If this difference exceeds a limit, this is an indication that the rate of cells arriving from the switching network is close to the transmission capacity of channel 1 or even exceeds it. If a less robust combination of coding and modulating methods is used in such a situation, it is possible to clear a data jam in input buffer 3. If this leads to the filling level of the input buffer 3 to drop below a second, lower limit, the MAC unit 4 reverts to the original, more robust combination.

A third method of detecting overload is to have the coding and modulating method selected by the MAC unit 4 according to information on the quality of downlink channel 1 fed back by the subscriber station M. Such information may e.g. be derived by the MAC unit 4 from the frequency of requests by the subscriber station to repeat transmission of cells that have been received defectively. Here, too, it can be provided that the MAC unit changes over to a more robust combination if the frequency of such retransmissions exceeds a first limit, and it is possible to switch back to a less robust combination if the frequency of retransmissions drops below a second, lower threshold.

A fourth method is to select the combination (coding/modulation) according to a signal supplied externally to the MAC unit 4. Such a signal can e.g. be supplied by precipitation (rain) sensors (not shown in FIG. 2), which are distributed in the region of the cell supplied by the base station BS. Since precipitations generally lead to a worsening of transmission conditions, according to this alternative method a change over to a more robust combination is carried out if the precipitation sensors indicate precipitation in the region of the cell, and a less robust method is used if no precipitation exists.

According to a second embodiment of the invention, a combination of coding and modulating methods is determined individually for each time slot "Slot I" to "Slot N" of the downlink frame shown in FIG. 3. This embodiment is particularly appropriate if the radio communication system is to be capable of transmitting a variety of types of connections having different requirements as to transmission delay, data rate, bit error ratio etc. This embodiment is capable of reacting more flexibly to changes in the channel load or the transmission conditions. The structure of the downlink frame of this embodiment is essentially the same as described above referring to FIG. 3; the essential difference being that the number p of modem signalling sections MS1, . . . , MSp and cell sections C1, Cp can vary from one time slot to the next, since the number of cells that can be accommodated into the time slot varies according to the coding and modulating methods used for that time slot.

If in this embodiment the load exceeds a critical threshold, it is not necessary to change over all existing transmission connections to a more robust combination; it being sufficient to change over a limited number of them. If it is found that for a certain connection a more robust combination is needed, this connection can simply be assigned to another time slot in which free capacity is available, and which employs this more robust coding. In the time slot originally used for this connection, transmission capacity is thus liberated. This transmission capacity may be assigned to another connection. In case of need, this free capacity can also be used for switching over all connections remaining in this original time slot to a more robust combination.

Referring again to FIG. 2 the subscriber station M comprises receiving and sending sections for respectively receiving the downlink channel 1 and sending the uplink channel 2. The receiving section comprises: a demodulator 31; control means 32 which, amongst other things, is used to determine the demodulating method to be used by demodulator 31 and which is inversely analogous to the modulating method of modulator 11; a demultiplexer 33 for extracting the synchronization sequence from the demodulated data stream; a decoder 35 for decoding the payload for the data stream using a decoding method determined by the control unit 32 which is the inverse of the coding method of encoder 5; a synchronization unit 34 for controlling the operation of decoder 31 and demodulator 35 according to the synchronization sequence received by demultiplexer 33; and an output buffer 39. The decoder 35 comprises a convolution decoder 36, an optional de-interleaving unit 37 and a block decoder 38. The control unit 32 is connected to the block decoder 38 in order to receive messages from it concerning non-correctable errors in a data block. Further, the control unit 32 is connected to the output buffer 39 in order to receive therefrom cells comprising signalling information originating from the base station BS that comprise indications of the demodulating and/or decoding method to be used by the receiving portion and, eventually, of a sending time interval assigned to subscriber station M in a future uplink frame by MAC unit 4, and a coding and modulating method to be used in the uplink.

The sending section of the subscriber station M comprises: an input buffer 51; an encoder 52 formed of a block encoder 53, optional interleaving unit 54 and convolution encoder 55; a multiplexer 56; a modulator 57; and a pilot sequence generator 58. The interconnection of the elements of the sending section is essentially the same as the sending section of the base station BS. Since the latter has already been described in detail it will not be described in detail again.

Figure 4:
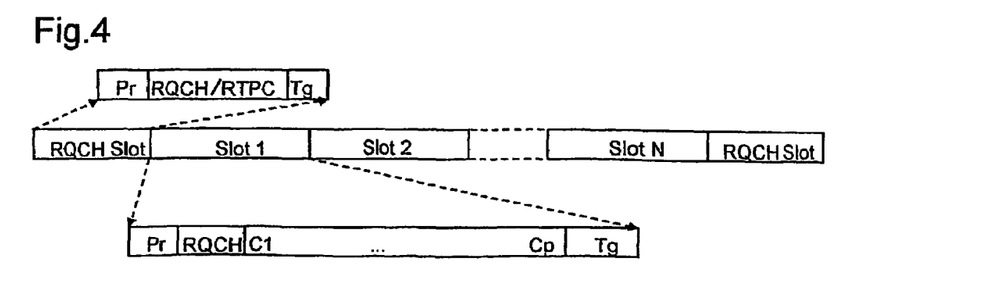
FIG. 4 shows the structure of a uplink frame for data transmission from the subscriber station to the central station of FIG. 2 and of individual time slots of this frame.

FIG. 4 shows the structure of a frame of the uplink signal transmitted on uplink channel 2 from the subscriber station M to the base station BS. The uplink frame is divided into a plurality of time slots that are not periodically distributed. The beginning time, duration and assignment of the timeslots of the uplink channel are communicated to the subscriber station M by the base station BS using the period control PDU transmitted once per downlink frame. Each time slot of the uplink signal comprises a preamble Pr, a data section and a safety time interval $T_g$, the duration of which is determined according to the size of the cell served by the base station such that data transmitted from various subscriber stations M do not overlap at the base station in spite of subsequent transmission delays.

The length of the time slots can vary from one time slot to the next according to the number of cells transmitted therein. The number n of the cells can take values from 0 to 5. A time slot with n=0, referred to as RQCH slot or control slot, has only five bytes in its data section, comprising one byte for a MAC header, an indication of the transmitting subscriber station and its requirements for uplink transmission capacity to be assigned by MAC unit 4 and the downlink transmission power required by the station. The MAC unit 4 regularly assigns such RQCH slots to subscriber stations M registered with it in order to poll whether they have data to transmit.

Other time slots comprise one or more ATM cells in addition to the indications comprised in the RQCH slot, the number of cells being assigned by MAC unit 4.

The variable length of the time slots allows for a very efficient use of the uplink transmission capacity. Since an RQCH slot is very short, the transmission requirements of the subscriber stations registered with the MAC unit can be polled in a rather short period of time; on the other hand, several ATM cells that are to be sent in one uplink frame by one subscriber station can be transmitted without inserted protection time intervals by combining them into a single time slot, thereby efficiently utilising the transmission capacity of the channel.

The coding and modulating method to be used by the subscriber station M for transmitting to the base station BS in the uplink channel is selected by MAC unit 4 of the base station and is transmitted to the subscriber station M in the period control PDU. To this end, it is not necessary that the base station and the subscriber station both support the same coding and/or modulating methods for sending. In order to keep the costs for the subscriber stations low, it may be appropriate that the methods supported by these are only a subset of the methods supported by the base station, or that the methods supported by the individual subscriber stations can vary from one subscriber station to the next according to the type of services for which a subscriber station is provided or optimised. In the latter case, an indication of the coding and modulating methods supported by a subscriber station must be transmitted to the base station when establishing a connection, so that the MAC unit 4 of the base station can take account of this information when selecting a method to be used by the subscriber station.

The MAC unit 4 selects the coding and modulating method to be used by the subscriber station among the methods supported by it depending on the quality requirements of the connection, the quality of the uplink channel 2 and its load.

The quality of the uplink channel can be estimated quite simply based on its bit error ratio. For this purpose, the receiving section of the base station, much like the receiving section of the subscriber station M, comprises: a demodulator 71; a synchronization unit 72; a demultiplexer 73 for extracting the synchronization sequence 74; a decoder 75 formed of a convolution decoder 76, an optional de-interleaving unit 77 and a block decoder 78; and an output buffer 79. The block decoder 78 carries out a Reed Solomon decoding of the received data stream in order to re-establish the initial ATM cells therefrom. An output of the block decoder 78 is connected to MAC unit 4, by which the block decoder 78 outputs information about transmission errors found when decoding an ATM cell. This information serves two purposes. On the one hand, if a non-correctable transmission error in an ATM cell is signalled to MAC unit 4, the MAC can send a signalling message to subscriber station M requesting it to repeat the transmission of the defectively received cell. On the other hand, the MAC unit 4 estimates the transmission quality of the uplink channel 2 based on this information (for this purpose, information based on errors not correctable by block decoder 78 and on correctable errors can be used) and eventually causes the subscriber station M by means of the next broadcast period control PDU to employ a more robust coding and modulating method in order to decrease the number of errors, or it determines a less robust combination to be used if the error rate of the transmission is so low that this appears possible.

In order to estimate the load of the uplink channel 2, the MAC unit 4 includes a counter that is incremented whenever a request for transmission capacity is received from a subscriber station and which is decremented whenever the request is attended by transmission time being assigned. The incrementing or decrementing step can be a fixed number; alternatively, it may be proportional to the transmission capacity requested or assigned, respectively.

If the load of the uplink channel becomes to great, i.e. if the level of the counter exceeds a predetermined threshold, the MAC unit 4 selects one or more of the connections maintained by the base station that have a comparatively low error ratio in uplink transmission, and for these it selects a combination of coding and modulation having an increased spectral efficiency. Thus it becomes possible to attend more quickly to the transmission capacity requests of the subscriber stations and to decrease the counter level. If this level then drops below a second threshold, which is lower than the first one, the MAC unit 4 may assign a more robust combination to a connection having a comparatively high error ratio.

Figure 5:
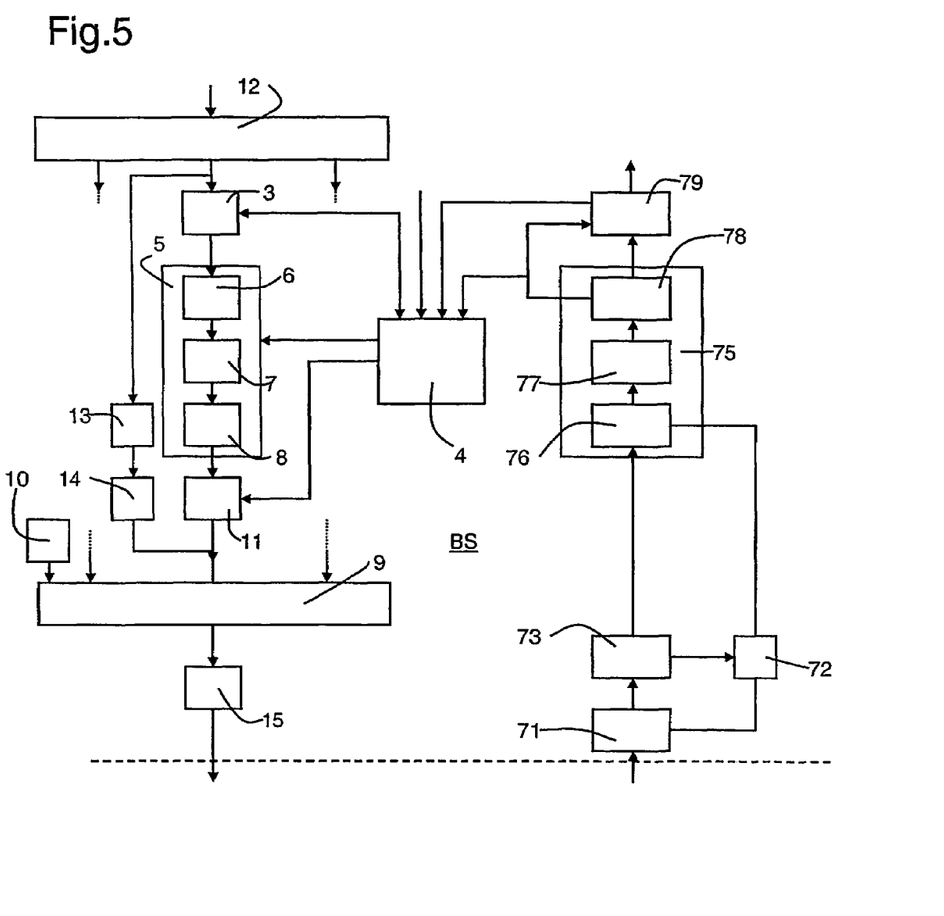
FIG. 5 is a block diagram of a central station according to a further embodiment of the invention.

FIG. 5 shows a more sophisticated embodiment of base station BS. Elements, which correspond to those of the base station BS of FIG. 2, are designated with the same reference symbols and are not described anew. The structure of the receiving section is the same in both base stations. In the sending section, a plurality of assemblies of input buffer 3 and encoder 5 is present, although only one such assembly is shown in FIG. 5. Upstream of the input buffer, there is a demultiplexer 12 receiving cells from an ATM node and conveying these, based on the connection to which they belong, to an input buffer 3 assigned to this connection. The MAC unit 4 controls the reading of the ATM cells from the input buffers 3. The ATM cells are read in groups of n cells from an input buffer. For each connection, a combination of coding and modulating methods for uplink and downlink is selected. The group of cells is combined with modem signalling information comprising indications on the selected combinations, uplink transmission power and frequency, etc. The ATM cells go through the encoder 5 and to the modulator 11; the signalling information passes through a convolution encoder 13 and to the modulator 14. The code rate of the convolution encoder 13 is less than that of convolution encoder 8 and has a value $r=1/4$ for example. The modulator 14 uses a constellation whose symbols are merely a subset of the symbols used by modulator 11. Thus, the modulator 14 can use BPSK modulation, whereas the modulator 11 uses QPSK, 8-PSK or alike.

Figure 6:
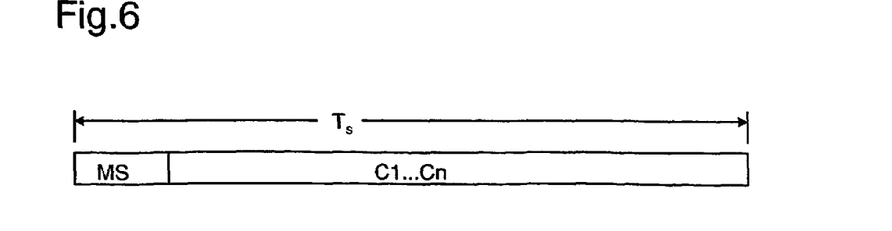
FIG. 6 shows the structure of a time slot of the downlink signal transmitted by the central station according to FIG. 5.

In this embodiment, the multiplexer 9 is located downstream of the modulators and combines the symbol blocks generated by modulators 11, 14 and a pilot sequence 10 to form a TDMA transmission symbol sequence in which the individual symbol blocks form time slots and which is divided into frames by the cyclical recurrence of the pilot sequence. The structure of such a time slot is shown in FIG. 6; a first section comprises the modem signalling MS with its coding overhead, a second comprises symbol blocks C1, . . . , Cn corresponding to the n coded ATM cells. This transmission symbol sequence is output to the downlink channel 1 via a filter 15.

In this embodiment the MAC unit 4 selects the number n of ATM cells according to a coding and modulation selected for the corresponding connection so that the resulting symbol blocks fill a time slot of a predetermined, constant length. According to the coding and/or modulation selected, the number of ATM cells that can be transmitted in a time slot may take a value n of e.g. between 1 and 4.

In order to evaluate the downlink signal, it is sufficient for the receiving subscriber station to use a demodulating method complementary to the modulating method used by modulator 14. In this way, the subscriber station M is able first to detect the pilot sequence in a received downlink signal and to find the borders between the time slots of the downlink signal based thereon. Thereby, it becomes possible to recognize the position of the headers of the individual time slots of the downlink signal, to evaluate these and thus to find out whether a time slot contains payload for the subscriber station concerned, and how the payload is modulated and coded.

The invention claimed is:

1. A method of data communication over transmission channels between a central base station (BS) and a plurality of mobile subscriber stations (M) in a mobile radio communication system, wherein a downlink transmission channel is divided into a plurality of frames each comprising a plurality of time slots of a constant length, whereas an uplink transmission channel is divided into a plurality of frames each comprising a plurality of time slots of a variable length, and access to the transmission channel uses a time division multiple access (TDMA) scheme, and wherein the BS and a specific M support a plurality of methods of coding and/or modulating a payload for transmission over the transmission channel, the method being for selecting the coding and/or modulating method, and comprising the steps of: detecting a load of the transmission channel; and selecting, for each time slot, the coding and/or modulating method in dependence upon the detected load, wherein the combination of coding and/or modulation is determined individually for each time slot of one downlink frame.

2. The method according to claim 1, wherein the detecting step is performed by detecting the load of the transmission channel according to a number of M communicating simultaneously with the BS.

3. The method according to claim 1, wherein the detecting step is performed by detecting the load of the transmission channel according to a filling level of a sending buffer at the BS.

4. The method according to claim 1, wherein the detecting step is performed by detecting the load of the transmission channel according to a number of transmission capacity requests of the M pending at the BS.

5. The method according to claim 1, wherein the selecting step is performed by selecting between at least two modulating constellations having different numbers of bits per symbol of the constellation, and wherein the bit number per symbol of the modulating constellation is selected to be higher, the higher the load of the transmission channel is.

6. The method according to claim 1, wherein the selecting step is performed by selecting between at least two different codings having different code rates, and wherein the code rate is selected to be higher, the higher the load of the transmission channel is.

7. The method according to claim 1, wherein the selecting step is performed by selecting the coding and/or modulating method in dependence upon a required bandwidth.

8. The method according to claim 1, wherein the selecting step is performed by selecting the coding and/or modulating method in dependence upon a quality of service of the transmission channel.

9. The method according to claim 1, wherein the selecting step is performed by selecting the coding and/or modulating method in dependence upon a quality of the transmission channel.

10. The method according to claim 9; and further comprising judging the quality of the transmission channel in dependence upon a bit error ratio obtained on the transmission channel.

11. The method according to claim 1; and further comprising cyclically selecting anew the coding and/or modulating method while the transmission channel is active.

12. The method according to claim 1, wherein the selecting step is performed by selecting the coding and/or modulating method separately for downlink and uplink transmission channels between the BS and the M.

13. The method according to claim 12, wherein the selecting step is performed by selecting the coding and/or modulating method individually for each transmission channel.

14. The method according to claim 1, wherein the selecting step is performed by selecting the coding and/or modulating method alike for all M communicating with the BS.

15. The method according to claim 1; and further comprising transmitting in each time slot a number of data packets dependent on the selected coding and/or modulating method.

16. The method according to claim 15, wherein the transmitting step is performed by transmitting in one time slot data packets intended for various M.

17. The method according to claim 15, wherein the transmitting step is performed by transmitting in one time slot data packets for one M only along with a control information (MS) defining the method to be used for decoding and/or demodulating the data packets.

18. The method according to claim 15, wherein the data packets are ATM-cells or IP-packets.

19. The method according to claim 15, wherein for transmission from an M to the BS a number of the data packets predefined by the BS is transmitted in one time slot.

20. The method according to claim 19, wherein the transmission channel is divided into signalling periods, and wherein the BS transmits a control data packet for each signalling period indicating a number of the data packets that can be transmitted in each time slot of the signalling period.

21. The method according to claim 1, wherein the time slots have a fixed length.

22. The method according to claim 1, wherein the method of selecting the coding and/or modulating methods comprises selecting an interleaving of data to be transmitted.

23. An access control device for controlling transmission channel access for a mobile radio communication system having a central base station (BS) and a plurality of mobile subscriber stations (M) that communicate with the BS by a downlink transmission channel divided into a plurality of frames each comprising a plurality of time slots of a constant length, and by an uplink transmission channel divided into a plurality of frames each comprising a plurality of time slots of a variable length, comprising: means for selecting and/or assigning, for each time slot, a coding and/or modulating method among a plurality of coding and/or modulating methods supported by the BS and a specific M in dependence on a load of the transmission channel, and adapted to determine the combination of coding and/or modulation individually for each time slot of one downlink frame.

24. The access device according to claim 23; and further comprising means for monitoring a filling level of a sending buffer at the BS.

25. The access device according to claim 23; and further comprising means for monitoring a number of the M communicating simultaneously with the BS.

26. The access device according to claim 23; and further comprising means for monitoring an amount of transmission capacity requests from the M pending at the BS.

27. The access device according to claim 23; and further comprising means for monitoring a bit error ratio of the transmission channel.

* * * * *